Figure 1:
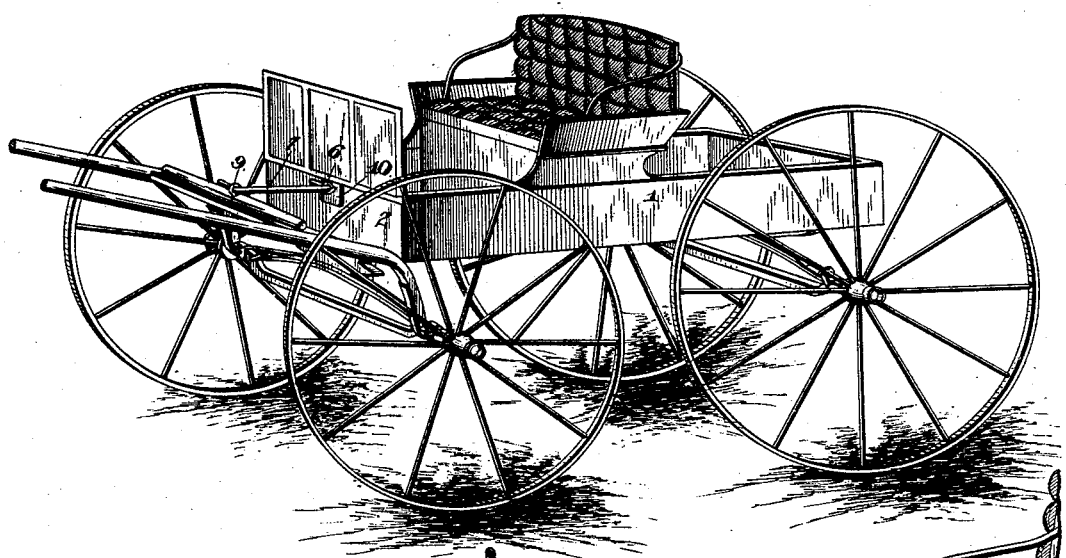
Figure 2:
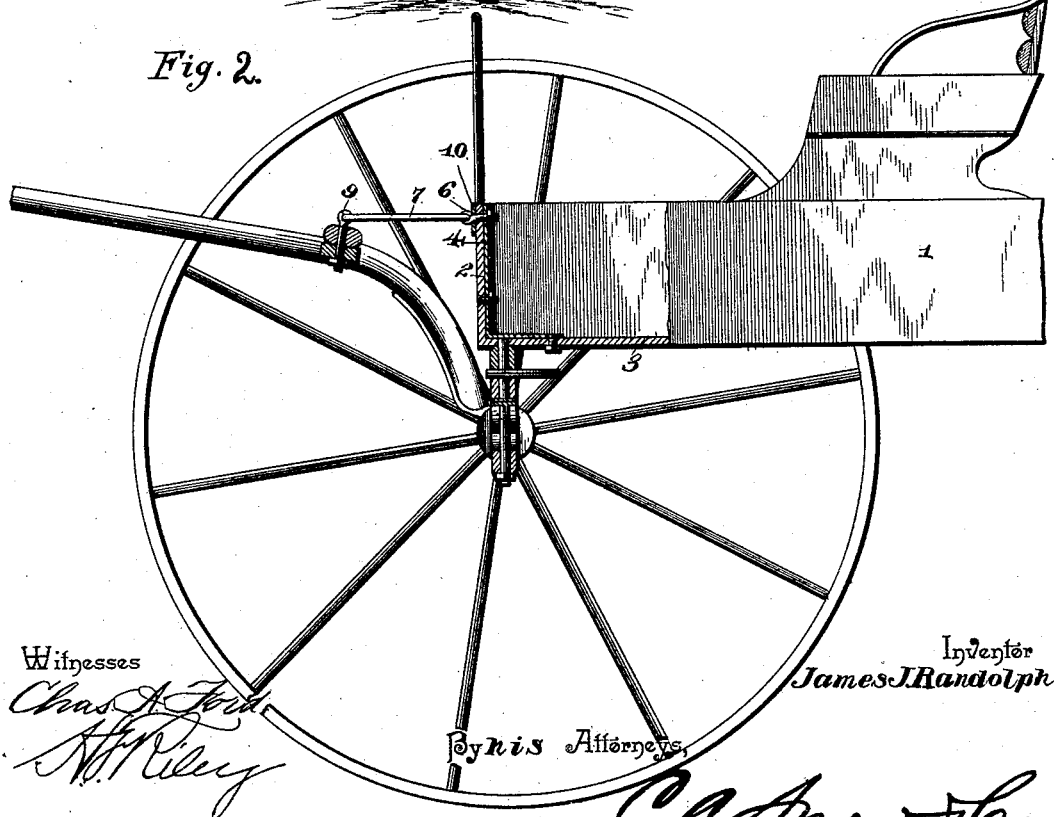

(No Model.)

J. J. RANDOLPH.
POLE OR SHAFT SUPPORT FOR VEHICLES.

No. 489,614. Patented Jan. 10, 1893.

Witnesses
Chas. A. Ford
N. F. Riley

Inventor
James J. Randolph
By his Attorneys
C. A. Snow & Co.

UNITED STATES PATENT OFFICE.

JAMES JACKSON RANDOLPH, OF CADIZ, KENTUCKY.

POLE OR SHAFT SUPPORT FOR VEHICLES.

SPECIFICATION forming part of Letters Patent No. 489,614, dated January 10, 1893.

Application filed April 29, 1892. Serial No. 431,154. (No model.)

*To all whom it may concern:*

Be it known that I, JAMES JACKSON RANDOLPH, a citizen of the United States, residing at Cadiz, in the county of Trigg and State of Kentucky, have invented a new and useful Shaft and Pole Holder, of which the following is a specification.

The invention relates to improvements in shaft and pole holders.

The object of the present invention is to provide a simple and inexpensive shaft and pole holder which may be readily adjusted or constructed to fit a vehicle and which will brace the body thereof, and be adapted to be readily arranged for holding shafts or a pole in an elevated position.

The invention consists in the construction and novel combination and arrangement of parts hereinafter fully described, illustrated in the accompanying drawings and pointed out in the claim hereto appended.

In the drawings—Figure I is a perspective view of a vehicle provided with a holder constructed in accordance with this invention. Fig. II is a central longitudinal sectional view.

Like numerals of reference indicate corresponding parts in both figures of the drawings.

1 designates a vehicle having bolted at its front to the inner faces of the front end board 2 and bottom 3 an L-shaped brace 4 which supports and braces the body of the vehicle, and which is provided near its upper end with openings through which passes a staple 6 forming an eye adapted to be engaged by one end of the hook 7. The outer end of the hook 7 engages a ring provided at the upper end of the pivot bolt 9 of the whiffletree, whereby the shafts of a vehicle or the pole thereof may be held in an elevated position. The front of the vehicle is provided with a face plate 10, which protects the paint or varnish of a vehicle from being scratched.

The brace which is constructed of metal may be readily bent to suit the body of the vehicle and is thereby quickly adjusted to any particular body, and it serves to support the same. The hook consists of a shank provided at each end with a hook adapted to engage the ring of the whiffletree bolt and the eye of the body.

It will be seen that the shaft and pole holder is simple and inexpensive in construction and may be readily applied to a vehicle.

What I claim is—

The combination with an axle, a body supported on the same, shafts coupled to the axle and having a whiffletree bolt provided at its upper end with an eye 9, of an L-shaped brace secured to the inside of the body and extending along the bottom and front thereof, a plate arranged on the outer face of the front of the body, a bolt passing through the front of the body and the brace and the plate and provided at its outer end with an eye, and a removable shank provided at each end with a hook removably engaging the eyes of the body and the shafts whereby the latter is held elevated, substantially as described.

In testimony that I claim the foregoing as my own I have hereto affixed my signature in the presence of two witnesses.

JAMES JACKSON RANDOLPH.

Witnesses:
P. G. JONES,
W. C. LASETER.